United States Patent
Wagle et al.

(10) Patent No.: US 11,386,082 B2
(45) Date of Patent: Jul. 12, 2022

(54) SPACE EFFICIENT VECTOR FOR COLUMNAR DATA STORAGE

(71) Applicant: SAP SE, Walldorf (DE)

(72) Inventors: Mehul Wagle, Walldorf (DE); Colin Florendo, Marlborough, MA (US); Pushkar Khadilkar, Pune (IN); Robert Schulze, Walldorf (DE); Reza Sherkat, Waterloo (CA); Amit Pathak, Pune (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/893,697

(22) Filed: Jun. 5, 2020

(65) Prior Publication Data
US 2020/0387488 A1    Dec. 10, 2020

Related U.S. Application Data

(60) Provisional application No. 62/858,693, filed on Jun. 7, 2019.

(51) Int. Cl.
*G06F 16/23* (2019.01)
*G06F 12/02* (2006.01)
(Continued)

(52) U.S. Cl.
CPC ........ *G06F 16/2379* (2019.01); *G06F 3/0604* (2013.01); *G06F 3/064* (2013.01);
(Continued)

(58) Field of Classification Search
CPC ............... G06F 16/2379; G06F 16/221; G06F 16/2237; G06F 16/2272
(Continued)

(56) References Cited

U.S. PATENT DOCUMENTS 9,817,858 B2    11/2017    Eisenreich et al.
9,852,169 B2    12/2017    Faerber et al.
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.
(Continued)

*Primary Examiner* — Syling Yen
(74) *Attorney, Agent, or Firm* — Sterne, Kessler, Goldstein & Fox P.L.L.C.

(57) ABSTRACT

Disclosed herein are system, method, and computer program product embodiments for providing paged and compressed storage for column data, while maintaining existing access mechanisms for the data. In order to reduce an in-memory footprint for column data, columns may be stored in pageable format using page chains, and only those pages of the column data needed to resolve a query will be placed in memory, and evicted from memory when no longer needed. In order to further reduce the footprint for these columns, compression can be applied, and the compressed column data stored in the same pageable format using page chains. The compressed data includes a plurality of vectors, each of which is converted into pages and stored on the page chain with the others so that they can be efficiently retrieved during database retrieval operations.

20 Claims, 4 Drawing Sheets

(51) Int. Cl.
G06F 3/06 (2006.01)
G06F 16/22 (2019.01)
G06F 12/0882 (2016.01)
G06F 16/2455 (2019.01)
G06F 12/0875 (2016.01)
G06F 9/48 (2006.01)

(52) U.S. Cl.
CPC .......... *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01); *G06F 16/2237* (2019.01); *G06F 16/2255* (2019.01); *G06F 16/2272* (2019.01); *G06F 16/2282* (2019.01); *G06F 16/24552* (2019.01); *G06F 16/24558* (2019.01); *G06F 2212/1024* (2013.01); *G06F 2212/1044* (2013.01)

(58) Field of Classification Search
USPC .......................................................... 707/822
See application file for complete search history.

(56) References Cited

U.S. PATENT DOCUMENTS

| 2014/0281212 | A1* | 9/2014 | Schreter | G06F 3/0611 |
| | | | | 711/112 |
| 2016/0012089 | A1 | 1/2016 | Sherkat et al. | |
| 2017/0322960 | A1 | 11/2017 | Glebe et al. | |
| 2018/0150222 | A1* | 5/2018 | Booss | G06F 3/0673 |
| 2018/0150494 | A1* | 5/2018 | Schulze | G06F 16/221 |
| 2020/0042441 | A1* | 2/2020 | Hsiao | G06F 3/0659 |

OTHER PUBLICATIONS

Aken, D.V. et al., "Automatic Database Management System Tuning Through Large-scale Machine Learning," ACM SIGMOD '17, May 14-19, 2017, pp. 1009-1024.
Alexiou, K. et al. "Adaptive Range Filters for Cold Data: Avoiding Trips to Siberia," Proc. of the VLDB Endowment, vol. 6, No. 14, 2013, pp. 1714-1725.
Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.
Andrei, M. et al., "SAP HANA Adoption of Non-Volatile Memory," Proc. of the VLDB Endowment, vol. 10, No. 12, 2017, p. 1754-1765.
Anh, V.N. and Moffat, A., "Index compression using 64-bit words," Software—Practice and Experience, vol. 40, 2010, pp. 131-147.
Arulraj, J. et al., "Multi-Tier Buffer Management and Storage System Design for Non-Volatile Memory," arXiv:1901.10938v1 [cs.DB], Jan. 30, 2019, 17 pages.
Belazzougui, D. et al., "Hash, displace, and compress," Algorithms—ESA 2009, Proc. 17th Annual European Symposium, Copenhagen, Denmark, Sep. 7-9, 2009, pp. 682-603.
Bhattacharjee, B. et al., "Efficient Index Compression in DB2 LUW," VLDB '09, vol. 2, No. 2, 2009, pp. 1462-1473.
Do, J. et al., "Turbocharging DBMS Buffer Pool Using SSDs," ACM SIGMOD, 2011, pp. 1113-1124.
Eldawy, A. et al., "Spatial Partitioning Techniques in SpatialHadoop," Proc. of the VLDB Endowment, vol. 8, No. 12, 2015, pp. 1602-1605.
Elghandour, I. et al., "An XML Index Advisor for DB2," ACM SIGMOD'08, Jun. 9-12, 2008, 4 pages.
Finkelstein, S. et al., "Physical Database Design for Relational Databases," ACM Trans. on Database Systems, vol. 13, No. 1, Mar. 1988, pp. 91-128.

Graefe, G. et al., "In-memory Performance for Big Data," Proc. of the VLDB Endowment, vol. 8, No. 1, 2014, pp. 37-48.
Graefe, G., "Volcano—An Extensible and Parallel Query Evaluation System," IEEE Trans. on Knowledge and Data Engineering, vol. 6, No. 1, Feb. 1994, pp. 120-135.
Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.
Lang, H. et al., Data Blocks: Hybrid OLTP and OLAP on Compressed Storage using both Vectorization and Compilation. ACM SIGMOD, 2016, pp. 311-326.
Larson, P. et al., "Real-Time Analytical Processing with SQL Server," Proc. of the VLDB Endowment, vol. 8, No. 12, Aug. 31-Sep. 4, 2015. pp 1740-1751.
Lee, J. et al., "Hybrid Garbage Collection for Multi-Version Concurrency Control in SAP HANA," ACM SIGMOD, Jun. 26-Jul. 1, 2016, pp. 1307-1318.
Leis, V. et al., "LeanStore: In-Memory Data Management Beyond Main Memory," IEEE ICDE, 2018, pp. 185-196.
Lemke, C. et al., "Speeding Up Queries in Column Stores—A Case for Compression," DAWAK, 2010, pp. 117-129.
Liu, X. and Salem, K., "Hybrid Storage Management for Database Systems," Proc. of the VLDB Endowment, vol. 6, No. 8, Aug. 26-30, 2013, pp. 541-552.
Majewski, B.S. et al., "A Family of Perfect Hashing Methods," The Computer Journal, vol. 39, No. 6., 1996, pp. 547-554.
May, N. et al., "SAP HANA—The Evolution of an In-Memory DBMS from Pure OLAP Processing Towards Mixed Workloads," BTW, 2017, pp. 545-563.
Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.
Müller, I. et al., "Adaptive String Dictionary Compression in In-Memory Column-Store Database Systems," Open Proceedings, 10.5441/002/edbt.2014.27, 2014, pp. 283-294.
Müller, I. et al., "Retrieval and Perfect Hashing Using Fingerprinting," J. Gudmundsson and J. Katajainen (Eds.), SEA 2014: Experimental Algorithms, Springer International Publishing, 2014, pp. 138-149.
Nehme, R. and Bruno, N., "Automated Partitioning Design in Parallel Database Systems," In ACM SIGMOD, 2011, pp. 1137-1148.
Neumann, T., Efficiently Compiling Efficient Query Plans for Modern Hardware, Proc. of the VLDB Endowment, vol. 4, No. 9, 2011, pp. 539-550.
Nica, A. et al., "Statisticum: Data Statistics Management in SAP HANA," Proc. of the VLDB Endowment, vol. 10, No. 12, 2017, pp. 658-1669.
On, S.T. et al., "FD-Buffer: A Buffer Manager for Databases on Flash Disks," ACM CIKM '10, Oct. 25-29, 2010, pp. 1297-1300.
Oracle® Database—Database In-Memory Guide, 19c, E96137-03, downloaded from https://docs.oracle.com/en/database/oracle/oracle-database/19/inmem/, Copyright 2016, 2020, 255 pages.
Pathak, A. et al., "Adaptive storage and access for simplified data management," *DaMoN* '19, Jul. 1, 2019, 6 pages.
Plaisance, J. et al., "Vectorized VByte Decoding," 1$^{st}$ Int'l Symp. on Web AlGorithms, Jun. 2015, 7 pages.
Plattner. H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.
Poess, M. and Potapov, D., "Data Compression in Oracle," Proc. of the VLDB Conference, 2003, pp. 937-947.
Sacco, G.M. and Schkolnick, M., "A Mechanism For Managing The Buffer Pool in a Relational Database System Using the Hot Set Model," Proc. of the Eighth Int'l. Conf. on Very Large Data Bases, Sep. 1982, pp. 257-262.
Sherkat, R. et al., "Page as You Go: Piecewise Columnar Access in SAP HANA," ACM SIGMOD '16, Jun. 26-Jul. 1, 2016, pp. 1295-1306.

(56) References Cited

OTHER PUBLICATIONS

Stoica, R. and Ailamaki, A., Enabling Efficient OS Paging for Main-Memory OLTP Databases. ACM DaMoN '13. 2013, 7 pages, 2013.

Willhalm, T. et al., "Vectorizing Database Column Scans with Complex Predicates," ADMS 2013, pp. 1-12.

Xie, D. et al., "Simba: Efficient In-Memory Spatial Analytics," ACM SIGMOD '16, Jun. 26-Jul. 1, 2016, pp. 1071-1085.

Zilio, D.C. et al., "DB2 Design Advisor: Integrated Automatic Physical Database Design," Procs. of the $30^{th}$ VLDB Conference, 2004, pp. 1087-1097.

* cited by examiner

SPACE EFFICIENT VECTOR FOR COLUMNAR DATA STORAGE

CROSS-REFERENCE TO RELATED APPLICATIONS

This application claims the benefit of U.S. Provisional Application No. 62/858,693, filed on Jun. 7, 2019, the contents of which are incorporated herein in their entirety.

BACKGROUND

In order to efficiently handle queries, databases are typically configured to perform in-memory operations on data. In an in-memory database, data needed to execute and respond to a query is loaded into memory, and the query is executed against that in-memory data.

However, many applications call for large data stores, and loading all of the required data into memory from these large data stores may be difficult or impossible due to memory limitations. Although the price and capacity of memory continues to favor larger memories for database systems, the amount of data being processed through database systems continues to grow faster than the memory specifications can keep up.

Modifying a code base to benefit from approaches to reduce memory needs can be challenging and costly as well. Accordingly, new approaches are needed to reduce the memory impact of in-memory databases while maintaining code portability.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
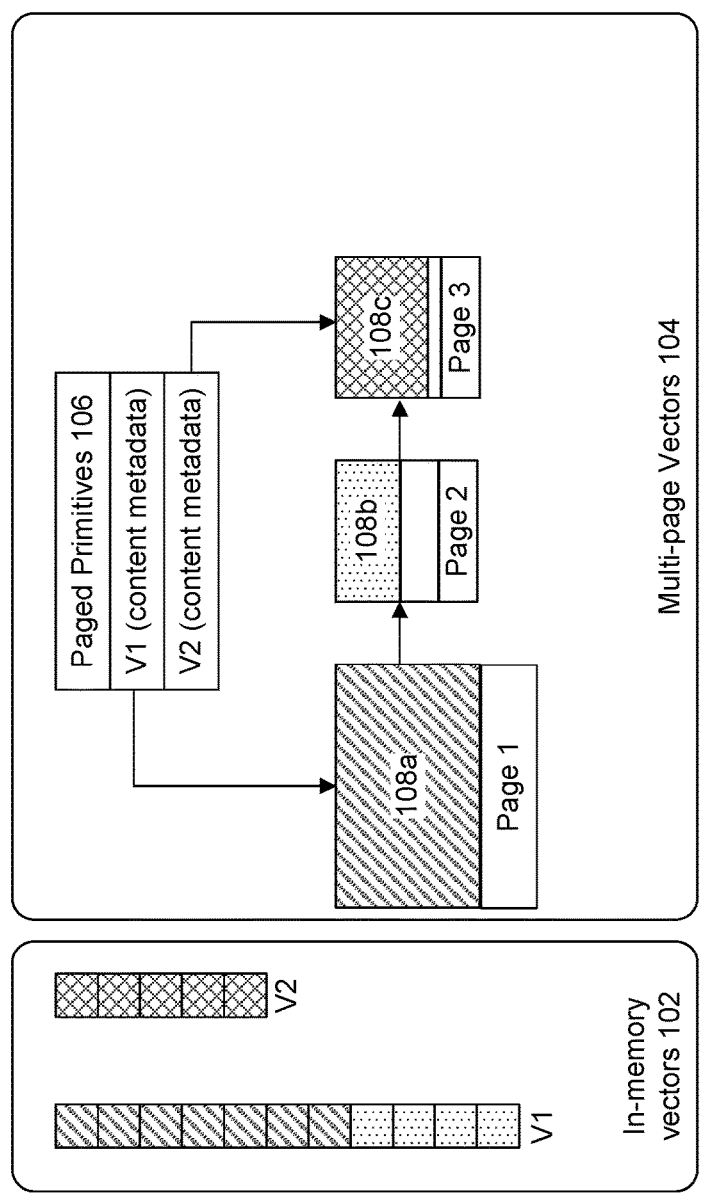
FIG. 1 illustrates an exemplary vector structure, in accordance with an embodiment.

Provided herein are system, apparatus, device, method and/or computer program product embodiments, and/or combinations and sub-combinations thereof, for reducing memory requirements of in-memory databases.

Due to the need to process large amounts of data quickly, analytical systems are commonly designed to work on in-memory columnar databases. When a query is performed on a column of the in-memory columnar database, the column is loaded into memory and used in the query. The column may be kept in memory for use in repeated queries, providing rapid results.

However, analytical databases often include large tables of many rows of data, resulting in large amounts of columnar data needing to be held in memory. This approach strains memory resources in analytical systems, as well as other systems that use in-memory columnar databases.

One approach to reduce the memory resources needed by analytical databases is to compress column data. A typical compression technique for columnar data stores is dictionary encoding, in which each column of a table is divided into a dictionary and an encoded data vector. In a simple dictionary encoding approach, data from the original column can be reconstructed by reading the encoded data vector, which contains symbols referencing entries within the dictionary, and obtaining the corresponding entries from the dictionary. For columns with recurring data, dictionary encoding is able to noticeably reduce memory requirements.

As an example of the benefits of dictionary compression, a column including a list of names ['Jack', 'Harry', 'Charlie', 'Jack', 'Charlie'] may have a dictionary of unique names that lists ['Jack', 'Harry', 'Charlie')]. Using this dictionary, the list of names can be simplified to [0, 1, 2, 0, 2], where the entries 0, 1, and 2 correspond to the index in the dictionary for the corresponding name. Over a much larger dataset, the space savings of this approach is potentially significant, and increases as the number of matching entries sharing a single dictionary entry increases.

An exemplary dictionary encoding approach such as the foregoing may be further compressed using N-bit encoding. In N-bit encoding, the data vector is commonly configured as an integer array formed from the original columnar data by substituting each value in the column with its numerical N-bit value ID (using dictionary encoding), and then compressed further by calculating a least number of bits in which each integer can be represented. For example, in the foregoing situation, a two-bit representation can be used to store the values '00' (for 0), '01' (for 1), and '10' (for 2), rather than using the full bit-width of an integer for storage (e.g., a fixed-width 32-bit integer representation). In a situation with 28 unique dictionary entries [0 . . . 27], it is possible to N-bit encode the representation in 5 binary bits of data—as 5 is the smallest power of 2 which is still able to represent the decimal integer 27.

With this N-bit encoding scheme in place, the data vector is re-encoded to store each element in N bits (e.g., two bits in the first example, five bits in the second example). In an embodiment, N-bit encoding provides a compressed representation of dictionary-encoded values in contiguous memory. In an additional embodiment, N-bit encoding can be structured to permit storage of the dictionary and encoded data vector in paged memory. One skilled in the relevant arts will appreciate that N-bit encoding can be applied to any integer vector, including composite data structures such as compressed schemes and exotic data types.

In an embodiment, column stores are composed from data access primitives, such as the data vector and the dictionary. These primitives enable the processing of hybrid columns using the same algorithms optimized for traditional in-memory columns and allow for fabrication of byte-compatible counterparts for complex memory resident data structures (e.g. dictionary and hash-index), compressed schemes (e.g. sparse and run-length encoding), and exotic data types (e.g. geo-spatial). A primitive hides the memory or paged nature of those parts behind standard APIs. As an example, the N-bit compressed data vector provides a compressed representation of dictionary-encoded values in contiguous memory, while the paged counterpart provides the same compressed byte compatible representation in paged memory. Both primitives provide the same API, but have a different memory footprint and performance characteristics.

Regardless of whether the primitives are held in contiguous memory or in paged memory, a byte-compatible representation is needed of both primitives. This would allow a codebase to seamlessly operate on either format with minimal adaption, hiding the details of operating on data.

In accordance with an embodiment, columns (and therefore their substructures, such as a dictionary, data vector, index, or auxiliary structure) can be specified as having column loadability or page loadability. These substructures may be stored as a flat structure, in which case they can be represented by a primitive (e.g., an N-bit compressed integer vector), or composed of additional data structures that themselves require one or more primitives. Column loadability or page loadability for a column is applied to all substructures and primitives of a column, in accordance with an embodiment.

A columnar store configured to support both column and page loadability is referred to as a hybrid column store. Column loadability refers to a configuration where a column (and therefore its primitives) is either fully loaded or fully unloaded into memory. Column loadability is commonly used with 'hot' columns, which are columns that are expected to be frequently accessed. In contrast, page loadability refers to a configuration where a column (and therefore its primitives) are loaded page-wise (e.g., in 16 kB memory pages), and also evicted from memory using an eviction strategy such as least-recently-used (LRU). Page loadability is commonly used with 'cold' columns, which are columns that are expected to be infrequently accessed and therefore can incur additional access delays without significant performance penalties. In addition, page loadability may be used for very large columns that do not fit into working memory in their entirety, and must be loaded as individual pages that fit within available working memory.

Columns that are paged reduce memory usage by only requiring needed pages to be loaded in memory, while the rest can be kept on disk. However, in order to implement both page loadability and compression, the lowest levels of database design and architecture are modified to support on-demand pageability of compressed formats of data vectors.

When compressing a column, the original primitives used by the column and column substructures (e.g., the column's data vector) can be replaced with a plurality of N-bit encoded integer arrays, in accordance with an embodiment. However, when these N-bit encoded integer arrays are constructed, it is not necessarily possible for the compression algorithm to know in advance how much space is needed for the final compressed array. This is in part because column generation is an incremental process—when filling column primitives with data, it is typically not clear how much space is needed for the final N-bit encoded structure.

For example, in an advanced encoding technique such as run length encoding, an uncompressed data array may read [5, 5, 5, 4, 4, 4, 4, 4, 3, 3, 3, 2, 2, 2, 2]. The array may be compressed into a value array and a start position array, in an embodiment. The value array indicates a given value at a corresponding start position, with a new start position given only when the value changes. In this example, the value array might be [5, 4, 3, 2] and the start position array might be [0, 3, 9, 12]—at position 0 and onward, the value is 5; at position 3 and onward, the value is 4, and so on. One skilled in the relevant arts will appreciate that other encoding techniques contemplated herein may result in the same or more numbers of vectors, and may have vectors of different sizes. Other non-limiting examples of encoding techniques may include prefix encoding, sparse encoding, cluster encoding, and/or indirect encoding. Additional information regarding these encoding techniques is found in application Ser. No. 16/866,766 entitled "A Hybrid Column Store Providing Both Paged and Memory-Resident Configurations," filed May 5, 2020 and incorporated herein by reference in its entirety.

As evident from the example, without fully compressing the array, a run length encoding approach would not know the expected size of the value and start position arrays. So approaches are needed to store these arrays compactly, even though their size is not known at the outset.

Accordingly, the primitive data structures used for the compressed output arrays employ a dynamic growth strategy, in accordance with an embodiment, to provide space efficiency of persistent storage. FIG. 1 illustrates an exemplary vector structure 100, in accordance with an embodiment. Vector structure 100 includes two in-memory vectors 102, such as two N-bit encoded integer arrays, by way of non-limiting example. These in-memory vectors 102 can be converted and stored as multi-page vectors 104, where they can be accessed as a fully-constructed in-memory vector as needed. This allows for rapid storage of advanced encoding techniques that may produce a plurality of vectors for a column, while providing rapid access to the vector contents.

Multi-page vectors 104 recognize the two vectors of in-memory vectors 102 by holding metadata for the paged primitives 106, in accordance with an embodiment. This metadata is used to, for example, determine positions within a vector, such as vectors V1 and V2, for specific data. When vectors V1 and V2 are loaded in-memory as in-memory vectors 102, any data operation on any row of V1 or V2 can be readily performed using the in-memory data.

However, in a paged approach, the multi-page vectors may be distributed across pages 108*a*, 108*b*, and 108*c*, by way of non-limiting example. In an embodiment, pages 108*a*, 108*b*, and 108*c* are fixed-sized pages, simplifying identification of a page that has the content for a given vector position (e.g., if each page is 256 kB in size and holds 10,000 rows, then data located at row position 12,000 will be located in page 2 108*b*, while data located at row position 26,000 will be located in page 3 108*c*.

As illustrated in FIG. 1, multi-page vectors 104 are configured to store more than one vector on each page chain, with each vector having its own metadata. A large vector can be stored on a single composite page chain which, by having a fixed number of objects (i.e., individual elements of the vector) per page, in an exemplary embodiment, helps in identification of the page that has the exact content for a given vector position. As the vector is stored, fixed-size pages can be added to the composite page chain as needed to accommodate the data for the vector.

Once a vector is sorted, each multi-page vector can be extended with a helper structure to facilitate search and to avoid loading pages that are guaranteed not to have a value that does not satisfy the search. In an embodiment, the helper structure is configured to store a single value (e.g., the first or last value) from each page of the vector stored on the page chain. Since the vector has been sorted, the set of single values from each page will also be in a sorted workflow, accelerating the search by using the helper structure to quickly determine a page that contains a given value using a binary search without the need to load the other pages that do not contain the given value.

Multi-page vector 104 can also include smaller vectors, such as vector V2, that fit within a single page, such as page 3 108*c*. To load vector V2 into memory, page 3 108*c* can be loaded without the need to also load pages 1 108*a* and 2 108*b*. During scans, a small vector is created directly pointing to memory of loaded page 108*c*, in accordance with an embodiment, so loaded page 108*c* does not need to be copied, reducing memory consumption. In addition, the composite page chain can be enhanced to store more than one vector, and each vector has its own independent metadata that controls the vector and helps identify size and other parameters of the vector. In an embodiment, the metadata includes the size of the corresponding vector and width of each element of the vector (e.g., N-bit for dictionary compression), which can be used to determine a fixed-width capacity of each page of the vector (i.e., a number of values per page). When the pages that are needed to satisfy the search are identified, an uncompressed version of a paged primitive 106 can be created by expanding the data from the vectors—in the case of compressed data, by decompression.

In accordance with an embodiment, the structure of the single page chain is consistent with storage for a single vector (e.g., a dictionary, or uncompressed column data) along with metadata indicating information such as start and end positions for the vector data. However, the approach described herein permits storage of multiple vectors within the single page chain. With this approach, a single columnar store can be stored as a plurality of paged N-bit vectors using enhanced compression as described above, without the need to recreate the mechanisms for storing page chain data.

In accordance with an embodiment, a composite page chain is logically contiguous. Data blocks of the composite page chain logically follow in sequence, although one skilled in the art will appreciate that physical contiguity on disk is not guaranteed. Accordingly, blocks of the composite page chain need to be allocated in a manner that accounts for this contiguity, while permitting vectors to grow independently of each other.

When persisting multiple vectors into a single composite page chain, appropriate strategies are needed for writing vector data to the page chain during a construction phase. These strategies include, by way of non-limiting example, static storage preallocation and dynamic storage growth. For example, vector space can be preallocated as part of vector initialization, and does not change during a write operation of the vector. In accordance with an embodiment, a user is permitted to specify a final size of the vector or vectors, and a corresponding number of fixed size pages corresponding to the final size (e.g., no. of pages * page size >=final size) can be preallocated in the page chain. In accordance with a further embodiment, a last page corresponding to a given vector is shrunk to compactly fit the data residing on that page.

Figure 2:
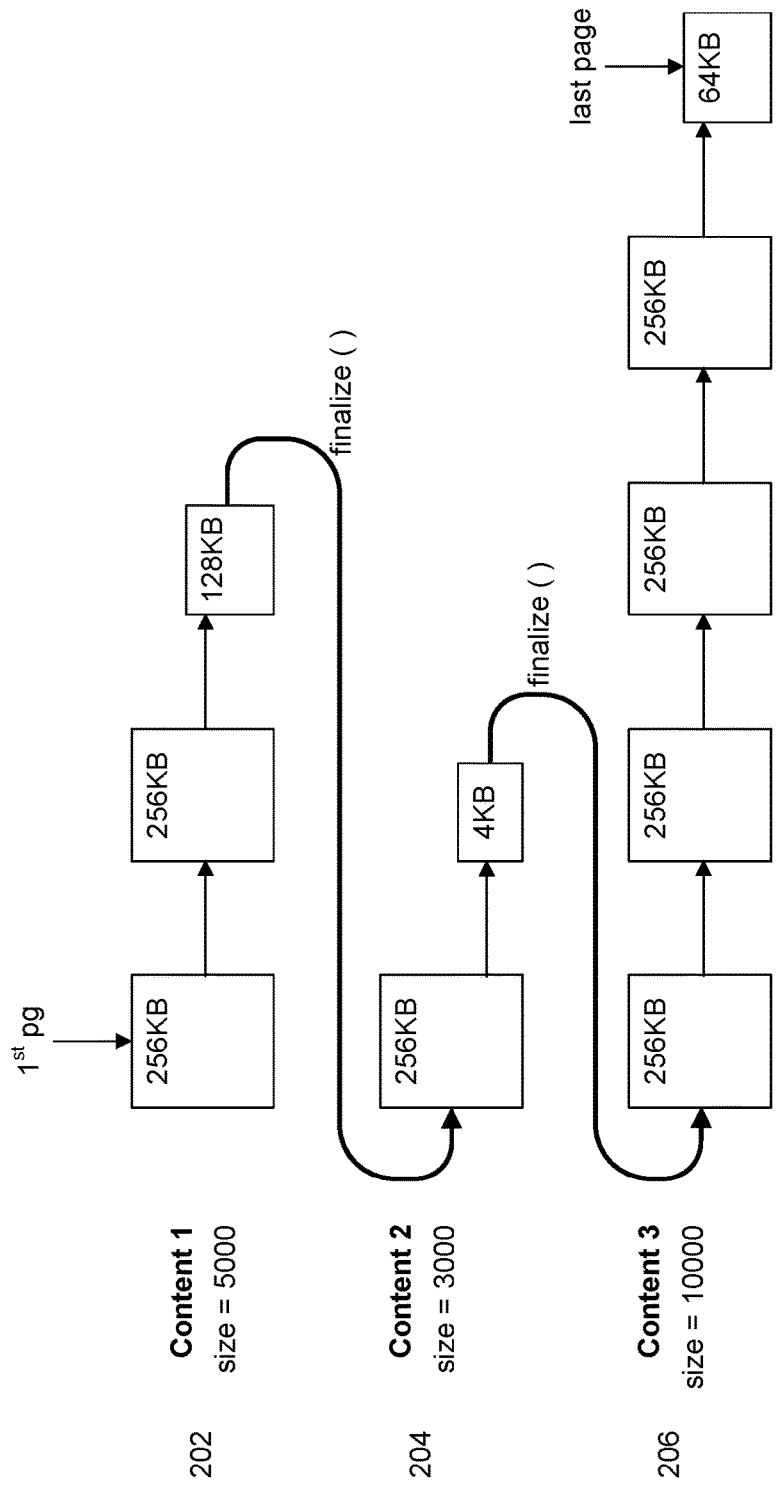
FIG. 2 illustrates a composite page chain including dynamic allocation of pages, in accordance with an embodiment.

FIG. 2 illustrates a composite page chain 200 including dynamic allocation of pages, in accordance with an embodiment. When constructing page chain 200 when vector sizes are not known (e.g., during enhanced compression, before the compression process is concluded and the result vectors are known), it is possible to presize the vector to a maximum size and then delete unnecessary pages or shrink oversized pages from the page chain. However, this strategy is significantly inefficient in terms of performance, since it may potentially waste the buffer cache capacity and CPU cycles by allocating pages before actual usage, which may degrade the overall I/O throughput. Deletion of unnecessary pages can also be an expensive operation.

Instead, composite page chain 200 permits growing the vector as needed, using a 'growable' writing mode, in accordance with an embodiment. This 'growable' writing mode allows the vector to be created by users as an empty object to begin with, but fixed size pages are added to the composite page chain upon actual user demand.

A situation of demand is identified as a write operation outside of the allocated space. For example, in the case of enhanced compression during creation of a paged N-bit vector, a demand is identified when the compression algorithm needs to set appropriate bits at positions outside a current size/range of the pages in the composite page chain 200 corresponding to the vector.

Composite page chain 200 includes three exemplary vectors, in an embodiment. Content 1 202 corresponds to a first vector, V1; content 2 204 corresponds to a second vector, V2; and content 3 206 corresponds to a third vector, V3. In each case, fixed-sized pages (shown as 256 kB pages) are added to each vector as needed. A final page in each case is also allocated, and is sized to compactly hold a final amount of data that is finalized in the vector at write completion time, in accordance with an embodiment. This is accomplished by shrinking the last page of the vector to select a page size to compactly fit the size of resident data. For example, if there is only one record residing in the last page of the vector, then the last (tail) page will use a page size of 4 KB (corresponding to a single block of data, assuming that is sufficient to hold a single record and is the minimal size for a file) rather than the fixed page size generally used for the other pages. Once constructed, the composite page chain is logically linked, so that all of the vectors are linked within the same composite page chain 200. In an embodiment, the last page of the vector (having a reduced page size) is linked to a first page of a next vector within composite page chain 200.

Metadata for each vector (e.g., content metadata for V1 and V2 in paged primitives 106) includes data regarding the multi-page vectors that can be used to reconstitute the vectors as in-memory vectors 102, with reference to FIG. 1. Each type of paged primitive (e.g., data, dictionary, index, etc.) may benefit from different strategies for the creation of page chains. In accordance with an embodiment, a label or other identifying information is provided in the metadata to allow identification of a vector as a particular type of paged primitive, and apply specific vector definition strategies as discussed above on the basis of this type.

Figure 3:
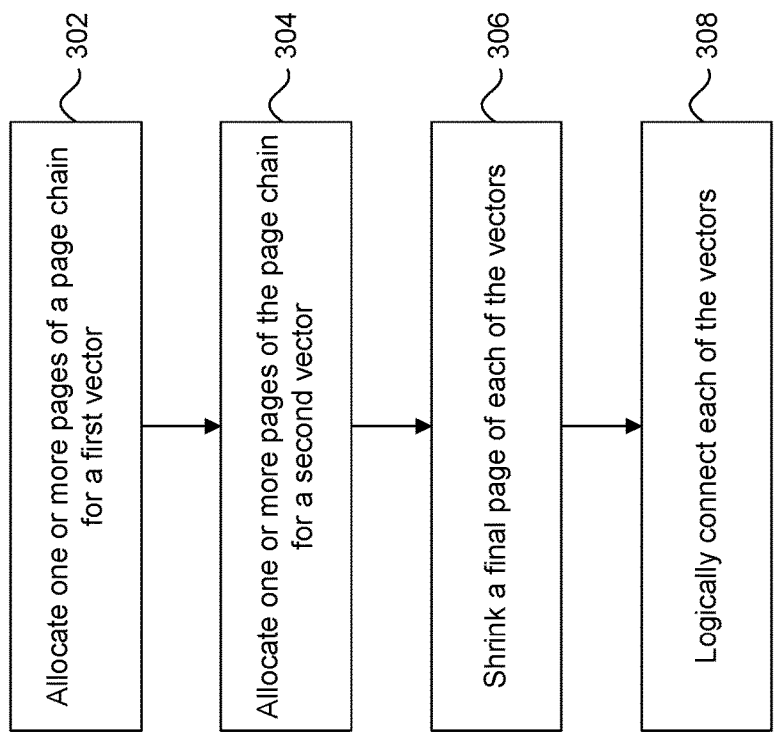
FIG. 3 is a flowchart illustrating steps for allocating a vector on a page chain, in accordance with an embodiment.

FIG. 3 is a flowchart 300 illustrating steps for allocating a vector on a page chain, in accordance with an embodiment. At step 302, one or more pages of a page chain are allocated for a first vector. At step 304, one or more pages of a page chain are allocated for a second vector. For example, if a source column is being converted into compressed paged storage, run length encoding may be performed on the data in the source column. In the example previously given, if the source column data is [5, 5, 5, 4, 4, 4, 4, 4, 4, 3, 3, 3, 2, 2, 2, 2], that array may be compressed using run length encoding to give a value array of [5, 4, 3, 2] and a start position array of [0, 3, 9, 12]. The value array and start position array, in this case, would be stored as the first vector in step 302 and the second vector in step 304 respectively. As the number of pages needed for the value and start position arrays may not be known, allocation of the one or more pages in steps 302 and 304 can occur by predefining a number of allocated pages, or by dynamically growing the page chain as disclosed herein.

With each of the vectors located into the page chain, a final page of each vector is shrunk to reduce its size at step 306, in accordance with an embodiment. As previously detailed, if there are fewer than a maximum number of vector elements held in the final page for any given vector, that page can be a candidate for size reduction as needed while still sized around the present vector elements. Then, at step 308, each of the vectors are logically connected together to ensure placement within a single page chain.

Figure 4:
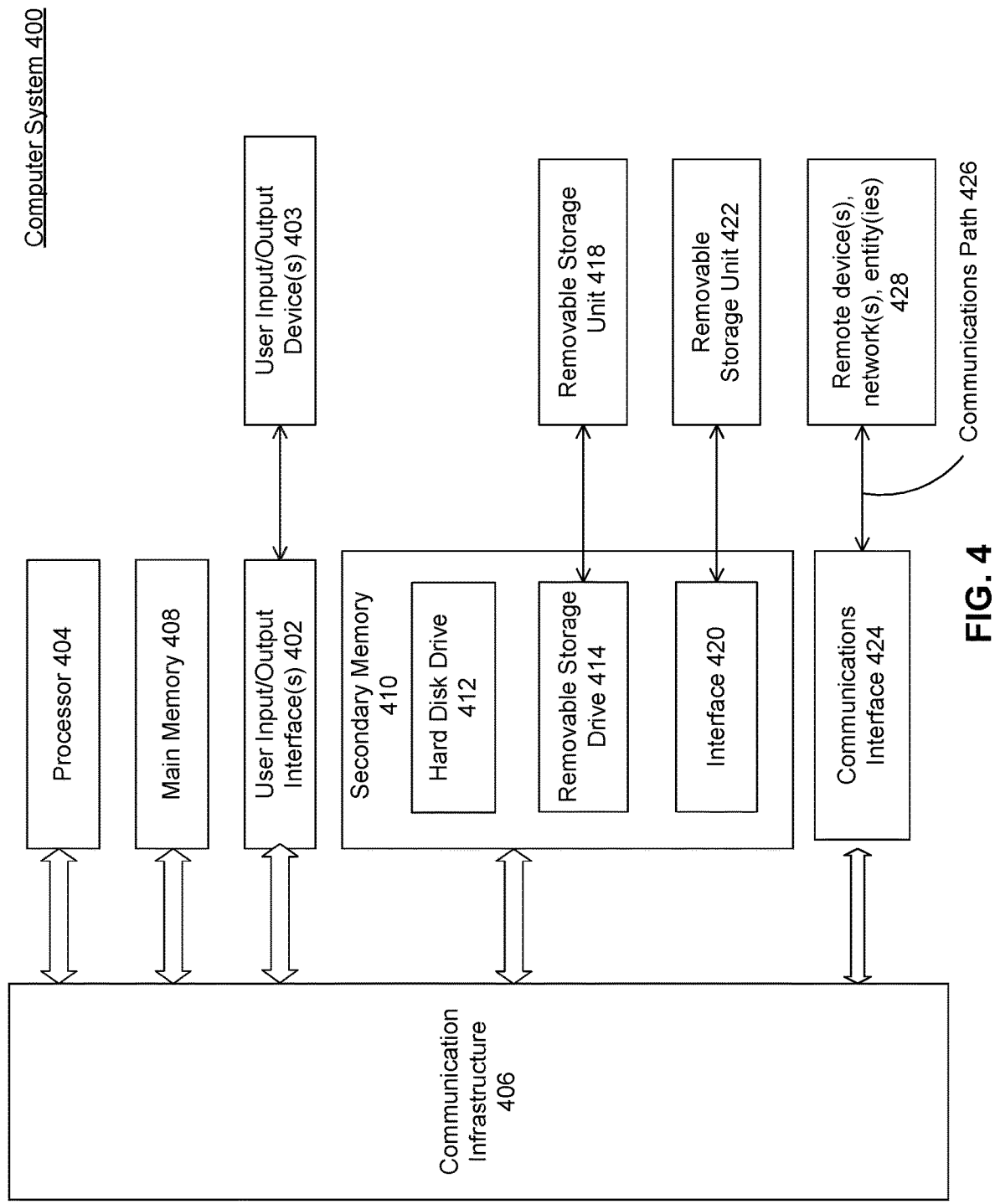
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. as well as non-graphical applications, such as training of machine learning models (e.g., efficient back propagation).

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424.

Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    allocating, by one or more computing devices, a first size of memory to each of a plurality of pages of a page chain for a first vector;
    allocating, by the one or more computing devices, a second size of memory to each of one or more pages of the page chain for a second vector;
    determining, by the ones or more computing devices, that a final page of the plurality of pages of the page chain for the first vector includes data that occupies less than the first size of memory allocated to the final page of the first vector;
    deallocating, by the one or more computing devices and responsive to the determination, a portion of the first size of memory previously allocated to the final page of the first vector, wherein the deallocation reduces a size of the first size of memory allocated to the final page, and wherein a remaining one or more pages of the plurality of pages of the page chain for the first vector remain at the first size; and
    logically connecting, by the one or more computing devices, the one or more pages of the page chain for the first vector with the one or more pages of the page chain for the second vector.

2. The computer implemented method of claim 1, comprising:
    executing, by the one or more computing devices, a compression algorithm on a data array, wherein a result of the compression algorithm is provided in the first vector and the second vector.

3. The computer implemented method of claim 2, wherein the allocating the one or more pages of the page chain for the first vector comprises determining that an element of the result of the compression algorithm requires storage outside of an allocated range of pages of the page chain for the first vector.

4. The computer implemented method of claim 2, wherein the compression algorithm comprises a compression algorithm selected from run length encoding, prefix encoding, encoding, cluster encoding, and indirect encoding.

5. The computer implemented method of claim 2, further comprising:
    determining, by the one or more computing devices, pages of the page chain needed to access data from the data array, based on metadata regarding the data array;
    expanding, by the one or more computing devices, the pages of the page chain needed to access the data from the data array; and
    loading, by the one or more computing devices, the expanded pages into memory.

6. The computer implemented method of claim 1, further comprising:
    sorting, by the one or more computing devices, the first vector and the second vector;
    creating, by the one or more computing devices, a helper structure comprising a value from an end of each page of the first vector and the second vector stored in the page chain; and
    searching, by the one or more computing devices, for a page matching a search value based on the value from the end of a page corresponding to the search value.

7. The computer implemented method of claim 1, wherein allocating one or more pages of a page chain for a first vector comprises allocating a first quantity of pages of the page chain for the first vector corresponding to a first predetermined memory size, and wherein allocating one or more pages of the page chain for a second vector comprises allocating a second quantity of pages of the page chain for the second vector corresponding to a second predetermined memory size.

8. The computer implemented method of claim 1, wherein each of the one or more pages of the page chain for the first vector are of a fixed size before the deallocating, and the final page of the first vector is smaller than the fixed size after the deallocating.

9. The computer implemented method of claim 1, wherein the deallocating comprises:
    determining a final amount of data in the final page; and
    reducing the first size of the page to a smallest size capable of storing the final amount of data.

10. A system, comprising:
    a memory configured to store operations; and
    one or more processors configured to perform the operations, the operations comprising:
        allocating a first size of memory to each of a plurality of pages of a page chain for a first vector;

allocating a second size of memory to each of one or more pages of the page chain for a second vector, determining that a final page of the plurality of pages of the page chain for the first vector includes data that occupies less than the first size of memory allocated to the final page of the first vector;

deallocating, responsive to the determination, a portion of the first size of memory previously allocated to the final page of the first vector, wherein the deallocation reduces a size of the first size of memory allocated to the final page, and wherein a remaining one or more pages of the plurality of pages of the page chain for the first vector remain at the first size; and logically connecting, by the one or more computing devices, the one or more pages of the page chain for the first vector with the one or more pages of the page chain for the second vector.

11. The system of claim 10, the operations comprising:

executing a compression algorithm on a data array, wherein a result of the compression algorithm is provided in the first vector and the second vector.

12. The system of claim 11, wherein the allocating the one or more pages of the page chain for the first vector comprises determining that an element of the result of the compression algorithm requires storage outside of an allocated range of pages of the page chain for the first vector.

13. The system of claim 11, wherein the compression algorithm comprises a compression algorithm selected from run length encoding, prefix encoding, sparse encoding, duster encoding, and indirect encoding.

14. The system of claim 11, the operations further comprising:

determining pages of the page chain needed to access data from the data array, based on metadata regarding the data array;

expanding the pages of the page chain needed to access the data from the data array; and loading the expanded pages into memory.

15. The system of claim 10, the operations further comprising:

sorting the first vector and the second vector;

creating a helper structure comprising a value from an end of each page of the first vector and the second vector stored in the page chain; and searching for a page matching a search value based on the value from the end of a page corresponding to the search value.

16. The system of claim 10, wherein allocating one or more pages of a page chain for a first vector comprises allocating a first quantity of pages of the page chain for the first vector corresponding to a first predetermined memory size, and wherein allocating one or more pages of the page chain for a second vector comprises allocating a second quantity of pages of the page chain for the second vector corresponding to a second predetermined memory size.

17. A computer readable storage device having instructions stored thereon, execution of which, by one or more processing devices, causes the one or more processing devices to perform operations comprising:

allocating a first size of memory to each of a plurality of pages of a page chain for a first vector;

allocating a second size of memory to each of one or more pages of the page chain for a second vector;

determining that a final page of the plurality of pages of the page chain for the first vector includes data that occupies less than the first size of memory allocated to the final page of the first vector;

deallocating, responsive to the determination, a portion of the first size of memory previously allocated to the final page of the first vector, wherein the deallocation reduces a size of the first size of memory allocated to the final page, and wherein a remaining one or more pages of the plurality of pages of the page chain for the first vector remain at the first size; and logically connecting the one or more pages of the page chain for the first vector with the one or more pages of the page chain for the second vector.

18. The computer readable storage device of claim 17, the operations comprising:

executing a compression algorithm on a data array, wherein a result of the compression algorithm is provided in the first vector and the second vector.

19. The computer readable storage device of claim 18, wherein the allocating the one or more pages of the page chain for the first vector comprises determining that an element of the result of the compression algorithm requires storage outside of an allocated range of pages of the page chain for the first vector.

20. The computer readable storage device of claim 18, the operations further comprising:

determining pages of the page chain needed to access data from the data array. based on metadata regarding the data array;

expanding the pages of the page chain needed to access the data from the data array; and loading the expanded pages into memory.

* * * * *